United States Patent [19]

McConica et al.

[11] Patent Number: 5,306,908

[45] Date of Patent: Apr. 26, 1994

[54] MANUALLY OPERATED HAND-HELD OPTICAL SCANNER WITH TACTILE SPEED CONTROL ASSEMBLY

[75] Inventors: Charles H. McConica, Fort Collins; Eric F. Aas, Windsor; Richard L. Kochis, Fort Colins; Dan L. Dalton, Greeley; Eugene A. Miksch, Loveland, all of Colo.

[73] Assignee: Hewlett-Packard Company, Palo Alto, Calif.

[21] Appl. No.: 31,771

[22] Filed: Mar. 15, 1993

[51] Int. Cl.5 .............................. H01J 3/14
[52] U.S. Cl. .................... 250/234; 235/472; 358/473
[58] Field of Search ........... 250/234, 235, 236, 208.1; 235/472; 358/473, 471; 382/59

[56] References Cited

U.S. PATENT DOCUMENTS

| | | |
|---|---|---|
| 3,541,248 | 11/1970 | Young ........................... 358/473 |
| 4,703,186 | 10/1987 | Nakayama et al. . |
| 4,709,144 | 11/1987 | Vincent . |
| 4,793,812 | 12/1988 | Sussman et al. ............... 358/473 |
| 4,870,268 | 9/1989 | Vincent et al. . |
| 4,926,041 | 5/1990 | Boyd . |
| 5,182,450 | 1/1993 | Pan ................................. 358/473 |

Primary Examiner—David C. Nelms

[57] ABSTRACT

A hand-held optical scanner comprising an optical sensor for generating a data signal representative of a scanned object; a housing for hand-displaceably supporting the optical sensor; a roller mounted on the housing for enabling rolling displacement of the housing over a scanned object in a predetermined scan direction; a displacement sensing device for sensing the angular displacement of the roller and generating a displacement signal representative thereof; a motor drivingly linked to the roller for applying a driving torque thereto; a controller for actuating the motor responsive to the displacement signal for angularly accelerating and decelerating the roller for urging an operator to hand displace the housing across a scanned object within a predetermined speed range which is optimal for scanning.

18 Claims, 5 Drawing Sheets

MANUALLY OPERATED HAND-HELD OPTICAL SCANNER WITH TACTILE SPEED CONTROL ASSEMBLY

BACKGROUND OF THE INVENTION

The present invention relates generally to hand-held optical scanners and, more particularly, to hand-held optical scanners in which the speed of hand scanning is controlled through the use of tactile feedback to the operator.

Optical scanners are used to produce machine-readable data which is representative of a scanned object, e.g. a page of printed text. Optical scanners employ line-focus systems to image scanned objects.

In a line-focus system, a light beam from an illuminated line object is imaged by a lens on a linear photosensor array which is positioned remotely from the line object. In an optical scanning device, the illuminated line object of the line-focus system is commonly referred to as a "scan line". The linear photosensor array is a single dimension array of photoelements which correspond to small area locations along the line object. These small area locations on the line object are commonly referred to as "picture elements" or "pixels". In response to light from its corresponding pixel location on the line object, each photoelement produces a data signal which is representative of the intensity of light which is impinged upon it. All of the photoelement data signals are received and processed by an appropriate data processing system which may subsequently store the data on a suitable medium or generate a display signal therefrom for reproducing an image of the object with a display device such as a CRT or printer.

Optical scanners and various components thereof are disclosed in U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; and U.S. Pat. No. 4,870,268 for COLOR COMBINER AND SEPARATOR AND IMPLEMENTATIONS of Kent J. Vincent and Hans D. Neuman, which are each hereby specifically incorporated by reference for all that is disclosed therein.

Most optical scanners have photoelectric conversion assemblies which employ charge coupled device (CCD) type photosensors. All of the photoelements in a CCD linear array have the same fixed operating (sampling) interval, e.g. one millisecond. A data signal is produced by each element at the end of an operating interval and is representative of an average of the light intensity which the element experiences during the operating interval. The scan speed of a scanner employing a linear CCD photosensor array is thus limited by the CCD operating interval. If the scanner displacement rate is greater than one scan line width per CCD operating interval, the scanner will not be able to collect enough data to produce an accurate representation of the document which is being scanned. In most types of optical scanners, e.g. flatbed, sheet-fed and overhead scanners, the scan speed is directly controlled by the scanner control system. The control systems of such scanners are typically designed to provide a scan speed which is less than, but near the maximum scan speed possible for proper operation with the system photoelectric conversion assembly.

A hand-held optical scanner is an optical scanner which is moved across a scanned object, e.g. a page of text, by hand. During hand scanning, the scanning speed, i.e., the speed at which an operator moves the scanner across the object, is dependent on the operator. If an operator moves the scanner too rapidly with respect to the operating speed of the scanner photoelectric conversion assembly, data necessary for creating an accurate image of the scanned object will be lost. On the other hand, if the operator moves the scanner at a low rate of speed to avoid data loss, the scanning process may take much more time than is necessary.

U.S. Pat. No. 4,703,186 of Nakayama et al., which is hereby specifically incorporated by reference for all that it discloses, describes a hand-held optical scanner with a speed control device. Several different speed control embodiments are described. In one embodiment, a friction disk is mechanically linked to a guide roller which rotates as the scanner is moved across a document. The friction disk is constructed to expand and move into frictional contact with a housing and thus produce a load resisting scanning motion when scanning speed exceeds a predetermined speed. In another embodiment, a flywheel and a rotating weight which moves radially outwardly relative to its rotation axis with increased scanning speed is employed to limit scanning speed and maintain a relatively smooth scanning speed. In another embodiment, the scanning unit is moved along a guide rail. An associated guide roller rotates, and thereby a DC motor is rotated in the reverse direction. "Then, the DC motor functions as a generator which produces a load practically proportional to the revolving rate thereof. The load thus produced tends to maintain the revolving rate of the guide roller at a fixed value, which controls the moving speed of the scanning unit for an approximate uniform motion."

Nakayama et al. thus describes certain methods for limiting scanning speed, but does not consider the performance problem associated with scanning at a speed slower than necessary.

SUMMARY OF THE INVENTION

The present invention is directed to a hand-held optical scanner which employs a speed control assembly to apply an accelerating torque to scanner drive rollers under certain conditions, typically when the operator is moving the scanner at a speed below a predetermined optimal scanning speed range. The optimum speed range may be selected to be a relatively small speed range around a preset target speed which is slightly below the maximum speed at which scanning can be performed without data loss. The speed control assembly also applies a decelerating torque to scanner drive rollers to prevent an operator from moving the scanner at too high a scanning speed to avoid image data loss or distortion.

The accelerating torque which is applied by the speed control system may be applied by a direct current (DC) motor. The accelerating torque is selected to be sufficiently low so that an operator may manually override the applied torque without causing slipping between the scanner drive rollers and the document being scanned. Applicants' have discovered that such a torque level is necessary to enable an operator to easily adjust scanning speed for various scanning operations. For example, an operator may wish to avoid scanning certain portions of a document and would thus wish to slow or possibly stop scanning motion as the undesired portion of the document is approached. Applicants have also discovered that when the supplied accelerating torque is maintained at a substantially constant magnitude, that most operators feel very comfortable with the scanner, probably because the torque feels predictable.

The speed control system "decides" when to apply the accelerating torque to the scanner rollers based upon a clock signal and a signal generated by a displacement sensor such as an encoder unit etc. which monitors the angular displacement of the scanner rolls. In one embodiment, the control system uses the time and displacement signals to calculate drive roll speed and actuates a drive motor linked to the roller to apply the accelerating torque whenever the current scanner speed is below a preselected speed value. In another embodiment of the invention, the control system uses the time and displacement signals to calculate both drive roll speed and drive roll acceleration and uses both values in determining when to apply the accelerating torque. This second embodiment is adapted to take into account a situation in which an operator may be moving the scanner at a speed somewhat below the optimal speed range and yet at the same time is rapidly accelerating the scanner. In such a case, the control system, taking acceleration into account, could eliminate application of the motor provided accelerating torque well before the optimum speed range is reached to prevent the operator from continuing to accelerate the scanner through the optimal speed range, i.e., to prevent overshooting the optimal range.

As previously mentioned, the control system applies a decelerating torque to prevent an operator from scanning a document at a speed greater than the optimal scanning speed range. The determination as to when to apply a decelerating torque is based upon calculated values of either roller velocity or roller velocity and acceleration such as discussed above. The applied decelerating torque may be constant or variable and is preferably of sufficient magnitude to prevent an operator from scanning at a speed greater than the optimal speed range, i.e. a decelerating torque sufficient to cause the rollers to skid on the scanned document is applied when the optimal scanning speed range is about to be exceeded.

The decelerating torque, like the accelerating torque, may be applied with any conventional motor and in one embodiment is provided with a DC motor. To supply an accelerating torque, the DC motor is connected to a power source of sufficient magnitude to apply the desired torque. To apply a decelerating torque the DC motor may be operated as a generator to dissipate mechanical energy which it receives from the drive rollers. The electrical output of the DC motor/generator may be applied to ground or, to increase the decelerating torque, may be applied to an opposite electrical potential. In one embodiment of the invention, an onboard battery is used as a power supply to operate the DC motor to apply accelerating torque to the scanner drive rolls. When the DC motor is operated as a generator to apply decelerating torque to the drive rolls, it is connected to the battery in reverse.

When the control system determines that the drive roll speed (or speed and acceleration) are such that neither accelerating drive torque nor decelerating drive torque is necessary, (typically when the scanner is being operated at a relatively constant speed within the optimal speed range) the drive motor is placed in a "free wheeling" state during which it applies no significant accelerating or decelerating torque.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
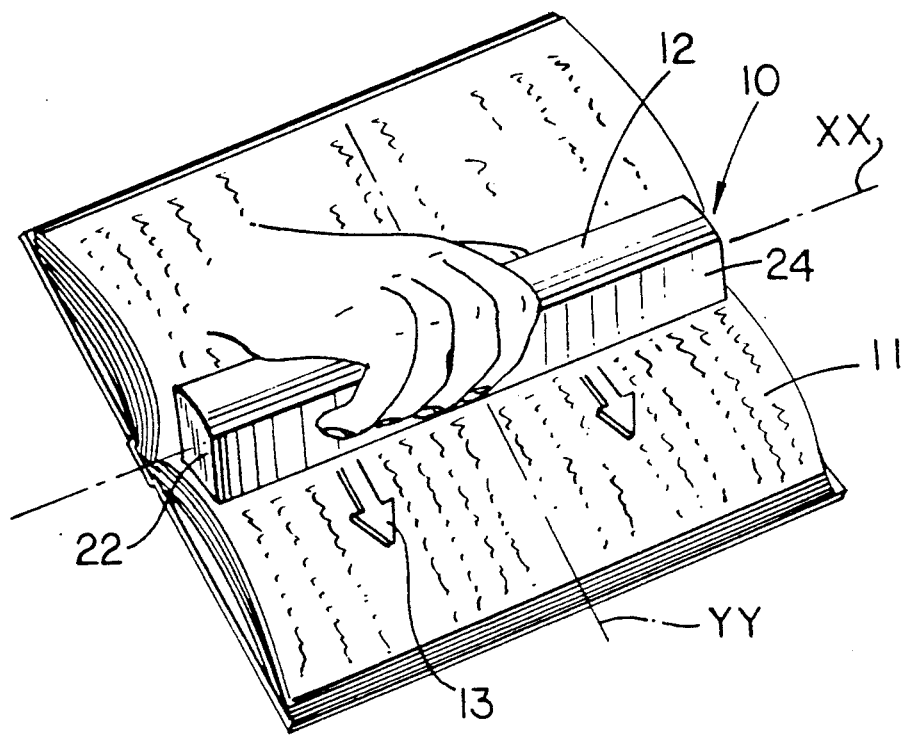
FIG. 1 is a perspective view of a hand-held optical scanner being used to scan the pages of a book.
Figure 2:
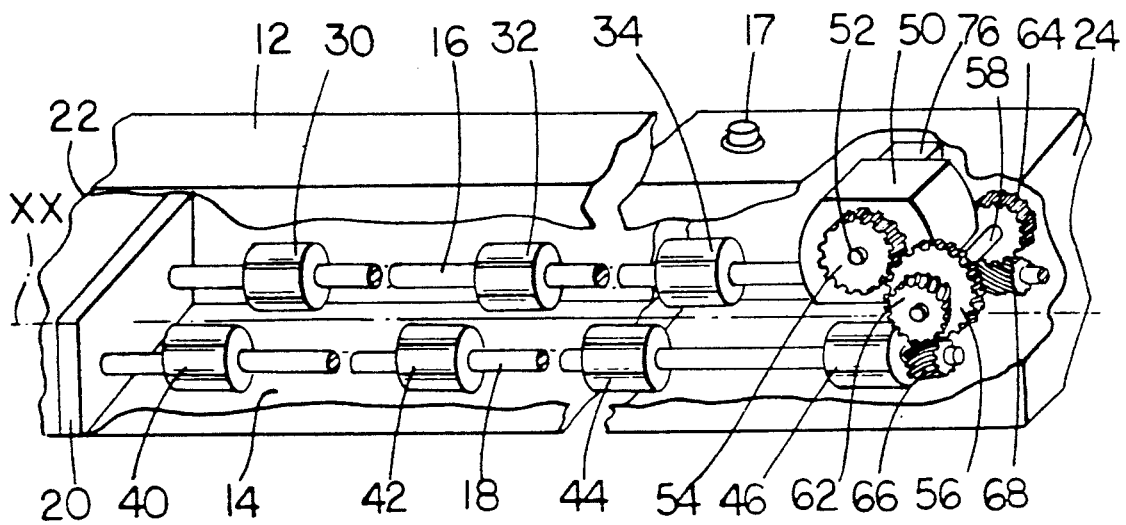
FIG. 2 is a partially cut away perspective view of a hand-held optical scanner housing, drive motor, drive rollers and mechanical linkage.
Figure 5:
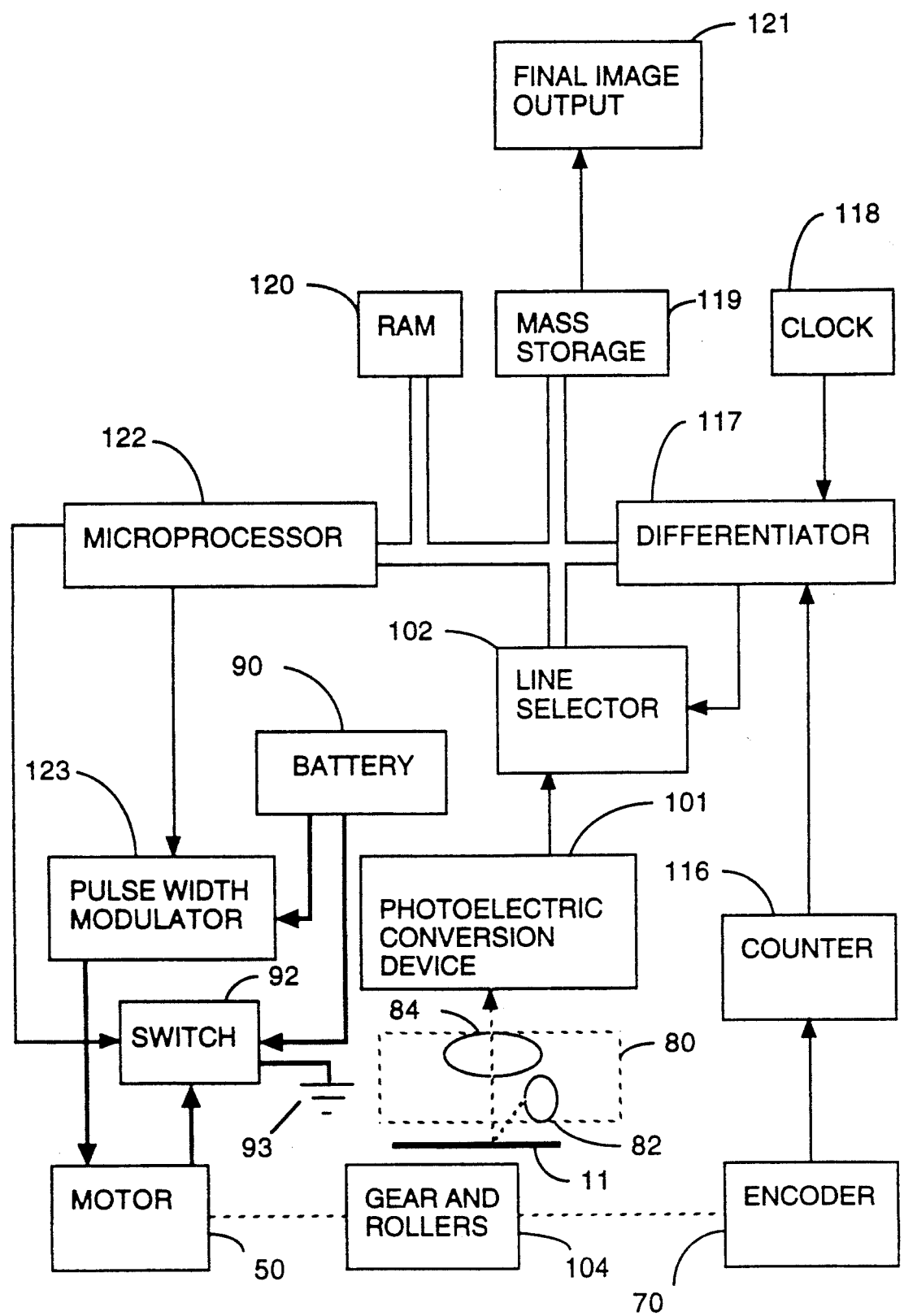
FIG. 5 is a block diagram showing the basic operating components of the hand-held scanner.

FIGS. 1, 2 and 5 illustrate various components of a hand-held optical scanner 10 which comprises an optical sensor assembly (photoelectric conversion device) 101 for generating a data signal representative of a scanned object 11 such as the page of a book. The scanner has a housing 12 which supports the optical sensor assembly 80.

A drive roller assembly 30, 32, 40, 42, etc. is operably mounted on the scanner housing 12 and enables the housing 12 to be rollingly displaced across an object 11 in a predetermined scan direction 13. A displacement sensing device, such as an encoder unit 70, senses the angular displacement of the drive rollers and generates a signal representation thereof. A motor 50 is drivingly linked to the drive rollers 30, 32, etc. for applying driving torque thereto. A control assembly actuates the motor 50 for angularly accelerating and decelerating the drive rollers so as to provide tactile feed back to urge an operator to hand displace the housing 12 across the scanned object 11 within a predetermined speed range which is optimal for scanning. The speed range is preferably selected to be a relatively small speed range just below the maximum scanning speed at which the unit can operate properly based upon the operating interval of the optical sensor assembly (photoelectric conversion device) 101.

Having thus described the invention in general, certain preferred embodiments of the invention will now be described in detail.

FIG. 1 illustrates a hand-held optical scanner 10 being used to scan a scan object 11 such as the page of a book. As illustrated in FIGS. 1 and 2, the hand-held optical scanner has an elongate, generally box-shaped housing 12 with an open or transparent bottom face 14. The housing has a central longitudinal axis XX extending in a direction parallel to scan lines on the object which are imaged and perpendicular to a scanning direction 13 (the direction in which the scanner is moved during a scanning operation). The scanner has a central lateral axis YY extending perpendicular to the longitudinal axis XX.

A scan on/off switch 17 may be provided on the housing or may be incorporated into a roller suspension system (not shown) such that the scanner is enabled for scanning by application of downward force to the scanner by the operator.

A pair of rotatable shafts 16, 18 extending parallel to central longitudinal axis XX are rotatably supported by support blocks 20 (only one shown) which are fixedly mounted at opposite end portions 22, 24 of the housing. A plurality of rollers 30, 32, 34, 40, 42, 44, 46 are fixedly attached to the shafts 16, 18 so as to rotate therewith. The rollers may be constructed from rubber, plastic or other suitable material having a coefficient of friction sufficient to non-slippingly engage the surface of a paper document during scanning displacement under normal operating conditions. However, the coefficient of friction of the rollers is sufficiently low so that the rollers will slide on the paper document under certain high speed or high acceleration operating conditions described in detail below.

A motor 50 is fixedly mounted within the housing 12. The motor has a rotatable drive shaft 52 which, in the illustrated embodiment, is arranged parallel to housing axis YY. The motor 50 may be a DC motor of a type commercially available such as that sold under the product designation model no. 16.11.182 by Buehler Products, Inc., P.O. Box 33400, Raleigh, N.C. A drive shaft gear 54 is fixedly attached to the drive shaft 52 and engages a gear 56 which is fixedly attached to a laterally disposed shaft 58 which may be journaled to forward and rear support blocks (not shown) which are fixedly associated with forward and rear portions of the housing. Identical gears 62, 64 are fixedly mounted on opposite ends of shaft 58 and are drivingly engaged with identical gears 66, 68 fixedly mounted on shafts 16 and 18, respectively. Drive shafts 16 and 18 are thus rotated by the DC motor in the same direction at identical angular velocities which are directly proportional to the angular velocity of DC motor drive shaft 52.

A conventional encoder unit 70 is operably associated with motor drive shaft 52 or another shaft, such as 58, 16, 18 of the drive system and provides a pulsed encoder output signal which is representative of angular displacement of drive rollers 30, 32, 40, 42, etc.

An optical assembly 80, shown schematically in FIG. 5, is situated within the housing and has an elongate scanning head (not shown) which may be of conventional construction and which is positioned between drive shafts 16, 18 extending parallel thereto. The optical assembly comprises a light source 82 in the scanning head which illuminates a current scan line portion of the document which is being scanned. The optical assembly also comprises an imaging assembly 84, which may comprise a conventional scanner lens assembly, which images the current scan line onto the image plane of a photoelectric conversion device 101 such as a conventional CCD array.

Figure 3:
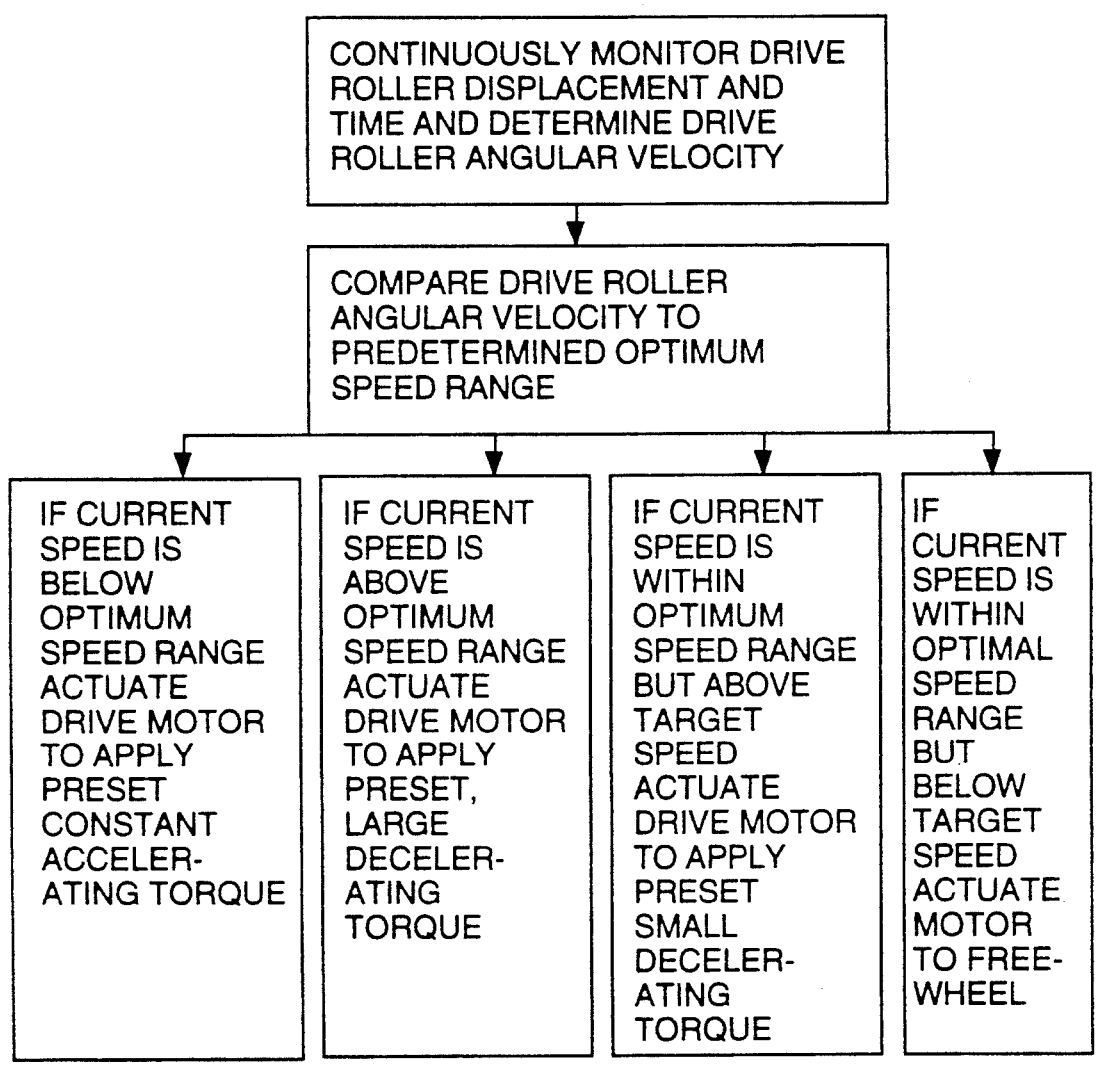
FIG. 3 is a block diagram showing basic control functions of a hand-held scanner speed control system of one embodiment.
Figure 6:
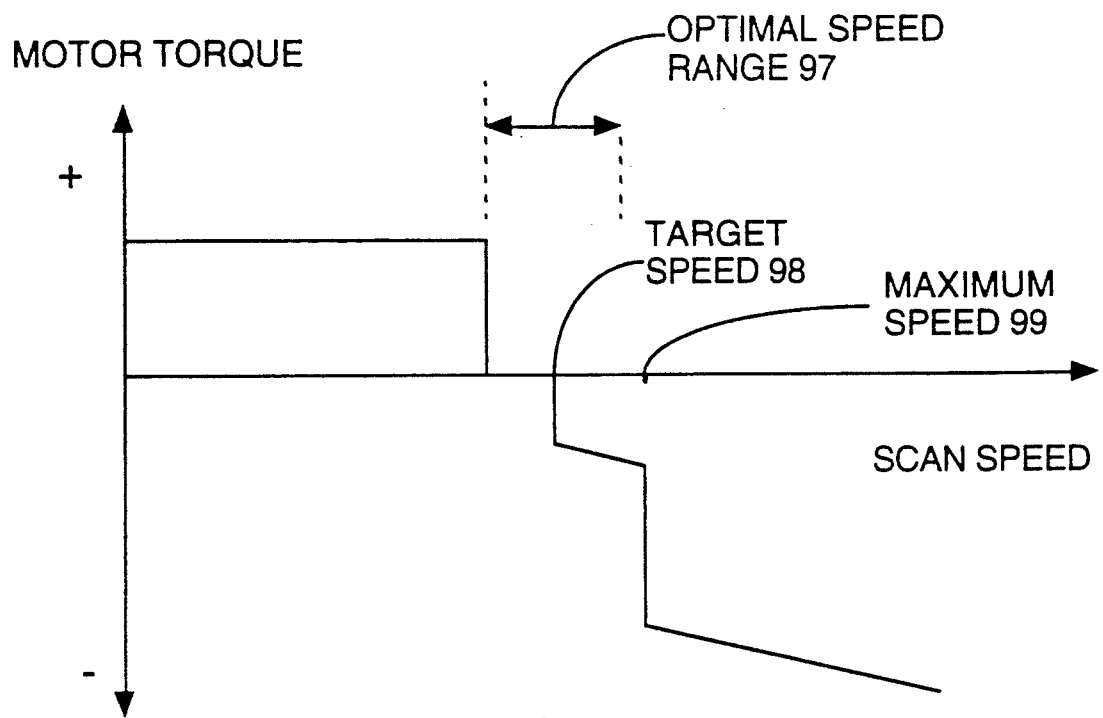
FIG. 6 is a graph illustrating applied motor torque as a function of scanning speed according to the control philosophy of FIG. 3.

FIGS. 3 and 6 illustrate the basic operations performed by the scanner speed control system of one embodiment. During any scan, the amount of angular displacement of the drive rollers is continuously monitored by use of encoder 70 and associated counter 116, FIG. 5. The first time derivative of roller angular displacement, i.e. angular velocity, is determined by use of signals from counter 116 and clock 118.

As further illustrated in FIG. 3, DC motor 50 is actuated to apply torque of a preselected value (either positive, or negative, or zero) to drive rollers 30, 40, etc. based upon a comparison of the current value of roller angular velocity to a predetermined optimal speed range 97. The optimal speed range 97 is a relatively small speed range which encompasses a target speed 98 which is slightly less than the maximum speed 99 at which the scanner can operate based upon the sampling rate of the photoelectric conversion device. As a typical example, the target speed 98 may be 95% of the maximum speed 99 and the optimal speed range 97 may extend from 90% of maximum speed 99 to 99% of maximum speed 99.

In this embodiment, the drive motor 50 is actuated to apply an accelerating torque to the drive rollers whenever the drive rollers are being moved at a speed below the preselected optimal range 97 of scanning speeds. The motor is actuated to apply zero torque to the drive rollers within the preselected optimal range 97 of scanning speeds. The motor is actuated to apply a constant smaller decelerating torque when the scanner rollers are moved at a speed above target speed, but within the preselected optimal range. A constant relatively high decelerating torque is applied at scanning speeds above the optimal range 97. Variations of this general control philosophy are used in more complex embodiments of the invention to anticipate potential overshoots and undershoots of the optimal speed range, such as discussed below.

Figure 4:
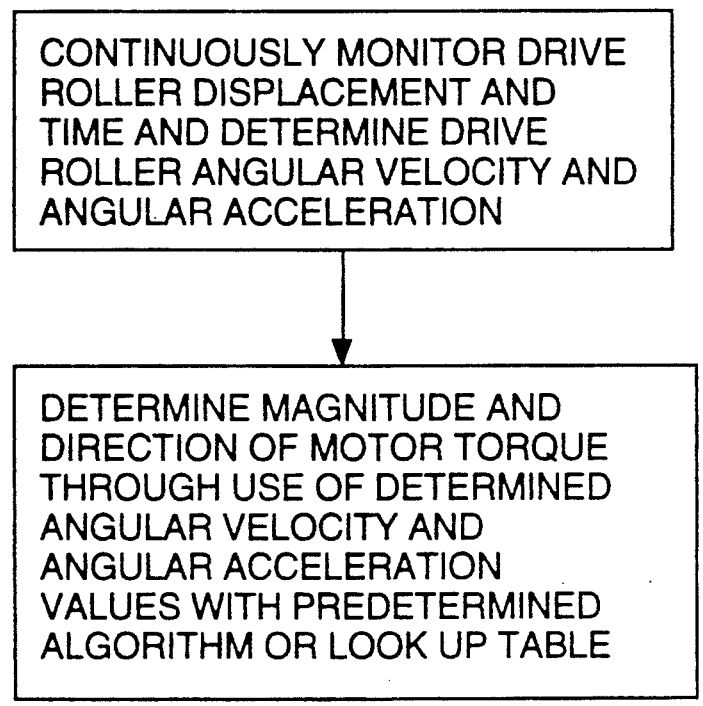
FIG. 4 is a block diagram showing basic control functions of a hand-held scanner speed control system of a second embodiment.
Figure 7:
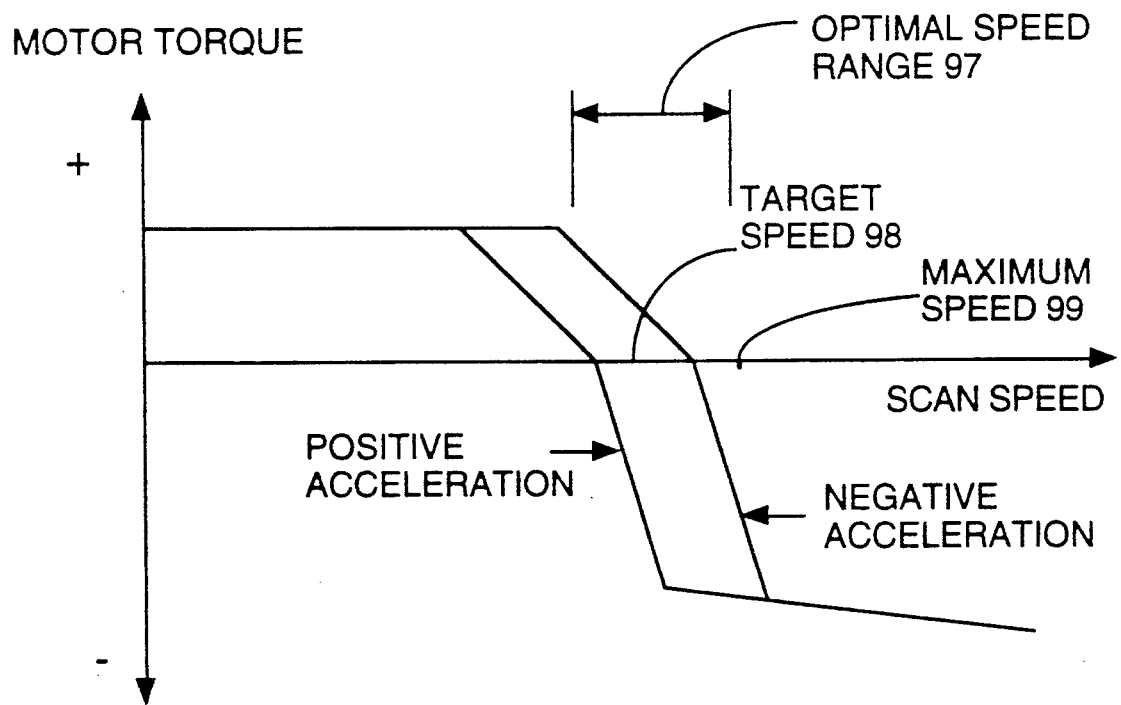
FIG. 7 is a graph illustrating one example of applied motor torque as a function of scanning speed according to the control philosophy of FIG. 4.

In the embodiment of FIGS. 4 and 7, the signals from encoder 70 and clock 118 are used to determine both the first and second time derivates of roller displacement, i.e. the angular velocity and angular acceleration of the drive rollers. The current velocity and acceleration values are then both used to determine the magnitude and direction of motor torque to be applied to the drive rollers. The velocity and acceleration values may be applied to a predetermined algorithm or look-up table to determine the drive motor torque to be applied. As the result of using acceleration as well as velocity in determining motor response, it may be seen from FIG. 7 that a central envelope is produced in the roller speed region near the optimal speed range 97. In that envelope the leading (right edge) represents the motor torque response when the operator is applying a substantial negative acceleration force to the scanner and the trailing (left) edge represents the motor torque response when the operator is applying a substantial accelerating force to the scanner. The use of acceleration as a control variable increases the effectiveness of the motor response in maintaining the operator within the optimal speed range. Further, time derivatives of displacement could also be used in a speed control system but are unlikely to significantly increase control system effectiveness.

It has been discovered by applicants that it is desirable, when operating at a speed range below the optimal speed range, to apply a constant value accelerating torque until the scanner reaches or nearly reaches the optimal scanning speed range. The constant value accelerating torque which is applied should be sufficiently low to enable an operator to override the torque in the event that he wishes to slow or stop the scanning operation. Applicants have discovered that such a combination of features in the low speed range provide a hand scanner which allows a user to feel in control and thus feel comfortable with the scanner. In order to apply a constant torque output, the current speed and acceleration of the motor and associated inertia of the system are first determined and then a conventional motor control algorithm or look-up table may be used to determine the energy which must be applied. Since motor speed is directly proportional to roller speed, a microprocessor may use this value to determine the needed input energy. The amount of energy input to the motor may be controlled by varying the voltage of the associated motor power source or, as described below, by pulsing a constant voltage energy supply to effectively provide a variable voltage.

It is another general feature of the control system that as the operator approaches a speed equal to the maximum functional scanning speed of the hand scanner, that a torque is applied which is sufficiently large to prevent the operator from exceeding the maximum scanning speed. If the operator attempts to accelerate the scanner beyond the maximum scanning speed, the reverse torque applied by the DC motor is sufficiently large to cause the rollers of the scanner to skid on the surface of the document being scanned when a normal amount of downward pressure is being applied to the scanner by the weight of the operator's hand.

Having thus described the operation of the control system in general, various specific components and functions thereof will now be described in further detail.

FIG. 5 shows a block diagram of the speed control system of the hand-held scanner of FIG. 1. A DC motor 50 is responsive to a voltage supplied from a battery 90 through a pulse width modulator 123 and supplies an angular velocity to the gear and roller assembly 104 which act to move optical assembly 80 and photoelectric conversion device 101 along the document 11 to be copied. The photoelectric conversion device 101 is an image receiving device such as a charge coupled device (CCD). A CCD operates to generate a data signal representative of optical images which are impinged thereon during successive operating intervals. Thus, a "picture" of a small portion of a scanned document (a scan line) is "taken" during each operating interval. The data signal is therefore representative of a series of pictures of scan line portions of a document which are generated as the scanner 10 is moved across the document. A typical CCD image sensing device takes a "picture" of the document approximately every millisecond. It will be readily apparent that the speed at which the hand-held scanner is moved across the document is critical because it determines the effective width of each scan line for which data is generated. If the scanner is moved too quickly, erratically or in reverse, information from the document will be lost. If the scanner is moved too slowly, redundant information will be gathered with a resulting loss in scanner performance. Therefore, the objective of the speed control system on the hand-held scanner is to urge the user to maintain an optimal forward speed. To this end, the speed control system must sample drive roller velocity and preferably, also drive roller acceleration, process this data and supply a positive or negative voltage to the motor, such that the torque produced by the motor helps the operator adjust the speed of the scanner.

In the preferred implementation, the movement of the scanner is tracked by means of a quadrature encoder 70 which is designed to provide two pulses that are 90 degrees out of phase. In one preferred embodiment, the encoder resolution and the drive gear ratio and roller circumference are such that the first pulse or the A pulse provides a rising edge every 13.123 mm of scanner travel which is the scan rate along a document for best image transfer results. The second pulse or the B pulse maintains and increments a 16 bit position counter 116 on every rising edge of the A pulse when the scanner is moving forward. The B pulse counter will de-increment on the falling edge of the A pulse when the scanner is moving backward, which should ordinarily not happen. At the beginning of every scan, the position counter will be reset. As long as a scan switch (provided in microprocessor software or associated firmware) is closed, A pulses will be counted. When the scan switch is open, A pulses will not be counted. Thus, the quadrature encoder acts as a position displacement counter and direction indicator.

A counter 116 will measure the time between A pulses. The counter 116 may run at about 200 kHz and will reset on the rising edge of the A pulse when the scanner is moving forward. If the scanner is moving in reverse, the counter will be reset on the falling edge of the A pulse. The counter value is then differentiated once to obtain velocity and twice to obtain acceleration. The differentiation is conducted by the differentiator 117. The position, direction, velocity and/or acceleration are then stored in RAM 120.

It should again be noted at this point, that if the tactile feedback control system uses a stair-step approximation approach as in FIG. 6, the acceleration will not be calculated and no allowance will be made for the acceleration of the scanner. Such a system would regulate the user's speed, but may over or under shoot the target speed when the user applies too much or too little force during the scan. By reacting to acceleration as well as velocity, the overshoot can be minimized and a target speed can be selected which is closer to the maximum scan speed. The target speed should be set to slightly less than the maximum speed that the photoelectrical conversion device 11 is capable of processing data. Then, any minor overshoot of target speed will not result in the loss of data.

Next, a digital signal processor or microprocessor 122 retrieves the velocity or velocity and acceleration information and converts these values to motor angular velocity and motor angular acceleration through use of an appropriate algorithm or look-up table. In one embodiment, angular velocity at count zero ($W_0$) is 13.123 mm times the gear ratio between drive shafts 16, 18 and motor drive shaft 52 divided by the velocity at count zero ($V_0$) times 4.571 μs times the roller radius.

$$\text{Angular Velocity } (W_0) = \frac{13.123 \text{ mm} \times \text{Gear Ratio}}{V_0 \times 4.571 \text{ μs} \times \text{Roller Radius}}$$

The angular acceleration at count zero ($a_0$) is the angular velocity at count zero ($W_0$) minus the angular velocity at the previous count ($W_{-1}$) divided by the velocity at count zero ($V_0$) times 4.571 μs.

$$\text{Angular Acceleration } (a_0) = \frac{W_0 - W_{-1}}{V_0 \times 4.571 \text{ μs}}$$

Both of the above conversions can be performed more efficiently by the microprocessor 122 via a look-up table.

The microprocessor will then calculate the voltage required to provide a preselected torque from the motor to provide tactile feedback to the operator so that he may be urged to operate the scanner at near the target speed. However, in one preferred embodiment, rather than performing the time consuming calculations necessary for this step, "fuzzy logic" is applied and then a table look-up operation is performed to find the desired torque voltage. Fuzzy logic is a control system whereby the designer establishes rules and tables such that a given velocity and acceleration will produce a predetermined torque voltage. Fuzzy logic reduces the amount of math required by the microprocessor, thus the microprocessor design and programming are simpler. Also, the response time is greatly enhanced with fuzzy logic.

Once a torque voltage for accelerating or decelerating the scanner is determined, the value must be converted to the effective voltage that will be supplied to the motor. To this end, a pulse width modulator (PWM) 123, capable of storing 256 discrete values, may regulate the effective voltage and voltage polarity seen by the motor. A pulse width modulator supplies a pulsed voltage and acts like a voltage regulator without losing voltage or overheating as a typical voltage regulator.

If, for example, the maximum voltage available to the motor is determined to be 12 volts, the voltage provided to the motor ($V_{motor}$) is calculated by multiplying $N_{0-255}$ by 12 (maximum motor voltage) and dividing by 255, which results in a number 0–12.

$$V_{motor} = \frac{N_{0-255} \times 12}{255}$$

where the number No. 255 is a number between 0 and 255, which was calculated by the microprocessor after the torque voltage was determined. $N_{0-255}$ is calculated by multiplying the torque constant (K) of the motor by the angular velocity at count zero ($W_0$) and adding the torque voltage ($V_{torque}$).

$$Number\ (N_{0-255}) = K \times W_0 + V_{torque}$$

After the motor voltage ($V_{torque}$) is calculated, the microprocessor programs the pulse width modulator with an appropriate duty cycle based upon this calculated motor voltage. An appropriate switch 92 setting is also selected based upon the calculated motor voltage, as described below.

FIG. 5 also shows the manner in which the motor 50 may be actuated to provide decelerating torque to the drive rollers. In this embodiment during application of decelerating torque the pulse width modulator is switched out and that motor terminal is connected to ground. A microprocessor responsive switching assembly 92 has a first operating state in which motor 50 is connected to neither battery 90 nor ground 93; a second operating state in which motor 50 is connected to ground 93 only; and a third operating state in which motor 50 is connected (in reverse) to battery 90 only. The switch is placed in a selected operating state by a control signal from microprocessor 122. In the first operating state the motor 50 is "free-wheeling" and provides no significant torque to the drive rollers. In the second operating state a first negative torque is provided by the motor. In the third operating state a second relatively larger magnitude negative torque is provided by the motor. In both the second and third operating states, the negative torque increases in magnitude with roller speed since generator output increases with speed. Such an assembly may be used to implement the control philosophy of FIG. 6. In an alternative embodiment, a variable resistance switching assembly connecting motor 50 and battery 90 is used to provide a selectively variable negative torque. In the control system shown in FIG. 5 in an alternative preferred embodiment deceleration torque is produced using the pulse width modulator in conjunction with appropriate switch setting.

In one preferred embodiment, the battery 90 is an onboard battery and provides electrical energy to all of the scanner components which use electrical energy.

Another function that the microprocessor 122 must perform is to interrupt the line selector 102 on every encoder rising edge, i.e. every 13.123 mm of scanner travel, and instruct the line selector to select a line of scan data to process and store the line scan data (in mass storage 119) for final image output as indicated at 121. In a preferred embodiment, the line selector will select two lines of data, the one immediately before and the one immediately after the encoder pulses, for example, and average the data from the two lines selected. This embodiment produces a more precise image than a single line per pulse.

In a preferred embodiment, the position counter 116, the differentiator 117, the clock 118, the RAM 120, the mass storage 119, the microprocessor (or DSP) 122, the switch 92 and the pulse width modulator 123 would all be implemented in an Application Specific Integrated Circuit (ASIC), which would save space and allow for a smaller, lighter scan device. Also, designing the above speed control circuitry into an ASIC would result in significant manufacturing and component cost savings during mass production.

The image signal produced by the above described method and apparatus may be internally stored on a mass storage device 119 mounted within the scanner housing and may also be transmitted to attached devices such as a personal computer (not shown) for further processing (e.g. OCR) or for storage on suitable media such as a hard drive, floppy disk or ROM disk; or for providing a visual display such as through an attached CRT or printer.

it is contemplated that the inventive concepts herein described may be variously otherwise embodied and it is intended that the appended claims be construed to include alternative embodiments of the invention except insofar as limited by the prior art.

What is claimed is:

1. A manually displaced, hand-held optical scanner comprising:
    a) optical sensor means for generating a data signal representative of a scanned object;
    b) housing means for hand-displacedly supporting said optical sensor means;
    c) roller means mounted on said housing means for enabling rolling displacement of said housing means over a scanned object in a predetermined scan direction;
    d) displacement sensing means for sensing the angular displacement of said roller means and generating a displacement signal representative thereof;
    e) motor means drivingly linked to said roller means for applying a driving torque thereto; and
    f) control means for actuating said motor means responsive to said displacement signal for angularly accelerating and decelerating said roller means for urging an operator to hand displace said housing means across a scanned within a predetermined speed range which is optimal for scanning.

2. The invention of claim 1 wherein said control means actuates said motor means to apply a constant accelerating torque to said roller means when said housing means is being displaced by said operator across a scanned object at a speed below said predetermined speed range.

3. The invention of claim 2 wherein said constant accelerating torque applied to said roller means when said housing means is being displaced by said operator across a scanned object at a speed below said predetermined speed range is sufficiently low to enable an operator to hold the housing means stationary on a scanned ordinary paper document without causing slipping between the roller means and the paper document whereby said operator is enabled to slow the rate of scanning to below said predetermined speed range to facilitate various hand scanning operations including changing the hand which holds the scanner and slowing or stopping scanning motion at a terminal edge portion of a scanned object.

4. The invention of claim 1 wherein said control means actuates said motor means to apply a decelerating torque to said roller means when said housing means is being displaced by said operator across a scanned object at a speed above said predetermined speed range; said applied decelerating torque increasing with the displacement speed of said housing means.

5. The invention of claim 1 wherein said optical sensor means has a predetermined maximum scanning speed for proper operation and wherein a decelerating torque applied to said roller means, when said housing means is being displaced by said operator across a scanned object at a speed above said predetermined speed range; is sufficiently great so as to cause slipping between the roller means and a scanned ordinary paper document at a speed below said predetermined maximum scanning speed of said optical sensor means whereby scanning at an inoperable speed is prevented.

6. The invention of claim 1 wherein said control means actuates said motor means to apply a constant accelerating torque to said roller means when said housing means is being displaced by said operator across a scanned object at a speed below said predetermined speed range and wherein said control means actuates said motor means to apply a decelerating torque to said roller means when said housing means is being displaced by said operator across a scanned object at a speed above said predetermined speed range; said applied decelerating torque increasing with the displacement speed of said housing means.

7. The invention of claim 6 wherein said constant accelerating torque applied to said roller means when said housing means is being displaced across a scanned object at a speed below said predetermined speed range is sufficiently low to enable an operator to hold the housing means stationary on a scanned ordinary paper document without causing slipping between the roller means and the paper document whereby said operator is enabled to slow the rate of scanning to below said predetermined optimal speed range to facilitate various hand scanning operations including changing the hand which holds the scanner and slowing or stopping scanning motion at a terminal edge portion of a scanned object and wherein said optical sensor means has a predetermined maximum scanning speed for proper operation and wherein said decelerating torque applied to said roller means when said housing means is being displaced across a scanned object at a speed above said predetermined speed range is sufficiently great so as to cause slipping between the roller means and a scanned ordinary paper document at a speed below said predetermined maximum scanning speed of said optical sensor means whereby scanning at an inoperable speed is prevented.

8. The invention of claim 1 wherein said motor means comprises a direct current motor operably connected to a battery, said motor being connected for receiving electrical energy from said battery for accelerating said motor in response to a control signal from said control means indicating that the speed of said housing means is below said predetermined optimal speed range.

9. The invention of claim 8, said direct current motor being grounded to dissipate electrical energy to decelerate said motor in response to a control signal from said control means indicating that the speed of said housing means is above said predetermined optimal speed range.

10. The invention of claim 8, said motor being connected to said battery so as to decelerate said motor in response to a control signal from said control means indicating that the speed of said housing means is above said predetermined optimal speed range.

11. A method of scanning an object with a manually displaced, hand-held optical scanner having housing means and rollers adapted for enabling rolling displacement of the scanner over the object comprising the steps of:
 a) applying an accelerating torque to the rollers when an operator is moving said scanner across an object at a speed below a predetermined speed range; and
 b) applying a decelerating torque to the rollers when an operator is moving said scanner across an object at a speed above a predetermined speed range.

12. The method of claim 11 wherein the step of applying an accelerating torque comprises applying a constant torque.

13. The method of claim 12 wherein the step of applying a constant torque comprises:
 applying a torque which is sufficiently low to enable an operator to hold the housing means stationary on a scanned ordinary paper document without causing slipping between the rollers and the paper document.

14. The method of claim 11 wherein the step of applying a decelerating torque comprises:
 applying a decelerating torque which increases in magnitude with the displacement speed of the housing means.

15. The method of claim 14 wherein said optical scanner has a predetermined maximum scanning speed for proper operation and wherein the step of applying decelerating torque comprises:
 applying a torque which is sufficiently great so as to cause slipping between the rollers and a scanned ordinary paper document at a speed below the predetermined maximum scanning speed of said optical scanner whereby scanning at an inoperable speed is prevented.

16. The invention of claim 11 wherein said optical scanner has a predetermined maximum scanning speed for proper operation and:
 wherein the step of applying an accelerating torque comprises applying a constant torque which is sufficiently low to enable an operator to hold the housing means stationary on a scanned ordinary paper document without causing slipping between the rollers and the paper document; and wherein the step of applying a decelerating torque comprises applying a torque which is sufficiently great so as to cause slipping between the rollers and a scanned ordinary paper document at a speed below the predetermined maximum scanning speed of said optical scanner whereby scanning at an inoperable speed is prevented.

17. The method of claim 11 wherein said rollers are drivingly linked to a direct current motor and:

wherein the step of applying an accelerating torque comprises connecting the direct current motor to a battery in a manner so as to receive electrical energy from the battery; and wherein the step of applying a decelerating torque comprises grounding the direct current motor.

18. The method of claim 11 wherein said rollers are drivingly linked to a direct current motor and:

wherein the step of applying an accelerating torque comprises connecting the direct current motor so as to receive electrical energy from a battery; and wherein the step of applying a decelerating torque comprises connecting the direct current motor to a battery.

* * * * *